United States Patent [19]
Field et al.

[11] Patent Number: 5,993,992
[45] Date of Patent: Nov. 30, 1999

[54] BATTERY PACK WITH CONNECTING BATTERY MODULES

[75] Inventors: Robert B. Field, Oakville; Vladimir S. Pavlovic, Mississauga, both of Canada

[73] Assignee: Norvik Traction Inc., Mississauga, Canada

[21] Appl. No.: 08/882,498

[22] Filed: Jun. 25, 1997

[51] Int. Cl.[6] .............................. H01M 2/20; H01M 2/22
[52] U.S. Cl. ......................... 429/158; 429/160; 429/156
[58] Field of Search ................................. 429/158, 160, 429/161, 152, 156

[56] References Cited

U.S. PATENT DOCUMENTS

| | | | |
|---|---|---|---|
| 4,217,400 | 8/1980 | Leffingwell | 429/7 |
| 4,311,952 | 1/1982 | Mabuchi et al. | 320/3 |
| 4,371,825 | 2/1983 | Chi et al. | 320/5 |
| 4,418,127 | 11/1983 | Shambaugh | 429/8 |
| 4,502,000 | 2/1985 | Mashikian | 320/6 |
| 4,585,712 | 4/1986 | Wedlake | 429/50 |
| 5,191,275 | 3/1993 | Singhal | 320/2 |
| 5,248,927 | 9/1993 | Takei et al. | 320/2 |
| 5,358,798 | 10/1994 | Kleinert, III | 429/7 |
| 5,418,444 | 5/1995 | Cook et al. | 320/7 |
| 5,496,654 | 3/1996 | Perkins | 429/1 |
| 5,503,948 | 4/1996 | MacKay et al. | 429/160 X |
| 5,545,491 | 8/1996 | Farley | 429/7 |

FOREIGN PATENT DOCUMENTS

| | | | |
|---|---|---|---|
| 347314 | 12/1927 | Belgium . | |
| 2136629 | 9/1984 | United Kingdom | H01M 10/50 |

OTHER PUBLICATIONS

Patent Abstracts of Japan, vol. 011, No. 036 (E–477), Feb. 3, 1987 & JP 61 206178 A (Matsushita Electric Ind. Co. Ltd.), Sep. 12, 1986.

*Primary Examiner*—John S. Maples
*Attorney, Agent, or Firm*—Ridout & Maybee

[57] ABSTRACT

A battery pack and method for connecting battery modules to optimize current sharing and charging of the modules. The battery pack comprises a number of battery modules, each module having respective positive and negative terminals. Interconnecting cables are provided for connecting the respective positive terminals and the respective negative terminals. The interconnecting cables have equal electrical lengths so that the Ohmic resistance is the same for the cables. The battery modules are also arranged in close proximity to form an isothermal zone.

4 Claims, 1 Drawing Sheet

5,993,992

BATTERY PACK WITH CONNECTING BATTERY MODULES

FIELD OF THE INVENTION

This invention relates to batteries, and more particularly to a method for interconnecting battery modules in parallel to form a rechargeable battery pack.

BACKGROUND OF THE INVENTION

The popularity of rechargeable batteries is increasing and the number of applications keeps growing. With the growing number of applications, demands are being put on the capacity requirements of the rechargeable batteries. To meet the capacity requirements, battery packs are being utilized. A battery pack comprises a number of lower capacity battery modules which are connected together in parallel to provide the increased output.

In conventional battery packs, the battery modules are typically connected in individual strings to obtain the desired voltage and then the individual strings are connected in parallel. Alternatively, the battery modules are connected in parallel without regard to current sharing. It will appreciated by those skilled in the art that the current sharing capability of battery packs is critical to the efficient recharging of the battery packs.

While existing battery pack configurations provide an increased output, there remains a need to improve the current sharing between the battery modules. The problem of current sharing becomes particularly acute in applications and recharging cycles where high currents are being utilized.

BRIEF SUMMARY OF THE INVENTION

The present provides an arrangement for interconnecting battery modules to optimize current sharing between modules. The optimal current sharing achieved by the interconnection arrangement according to the present invention improves considerably the charging performance and capacity of the battery modules.

According to the present invention, a multiple capacity battery pack is formed by connecting single modules in parallel rather connecting strings of battery modules in parallel. It is a feature of the present invention that interconnection resistance for every module is equal which, in turn, provides balanced current sharing. Balanced current sharing is desirable in the context of fast, i.e. high current rate, recharging so that one or more of the battery modules is not overcharged and possibly damaged. In other words, the equal resistance of the interconnection allows the charging current to be shared by the modules on an as accepted basis. The charging current is not forced into a battery module at a rate at which the module is not able to accept.

In a first aspect, the present invention provides a battery pack comprising: (a) a plurality of battery modules, each of said battery modules having a positive terminal and a negative terminal; (b) positive interconnecting cables for connecting the positive terminal of each of said battery modules; (c) negative interconnecting cables for connecting the negative terminal of each of said battery modules; (d) a negative output cable coupled to the negative terminal of one of said battery modules; (e) a positive output cable couples to the positive terminal of one of said battery modules; (f) wherein said positive and negative interconnecting cables each have the same length; and (g) wherein said positive and negative output cables have the same length.

In a second aspect, the present invention provides a method for forming a battery pack from a plurality of battery modules, said method comprising the steps of: positioning the battery modules in close proximity to each other; interconnecting the respective positive terminals on the battery modules with interconnecting cables of the same length; interconnecting the respective negative terminals on the battery modules with interconnecting cables of the same length.

In another aspect, the present invention provides a battery pack comprising: (a) a plurality of battery modules, each of said battery modules having a positive terminal and a negative terminal; (b) positive interconnecting cables for connecting the positive terminal of each of said battery modules; (c) negative interconnecting cables for connecting the negative terminal of each of said battery modules; (d) a negative output cable coupled to the negative terminal of one of said battery modules; (e) wherein said positive and negative interconnecting cables each have the same Ohmic resistance.

BRIEF DESCRIPTION OF THE DRAWINGS

Reference will now be made to the accompanying drawings which show, by way of example, a preferred embodiment of the present invention and in which.

DETAILED DESCRIPTION OF THE PREFERRED EMBODIMENT

Figure 1:
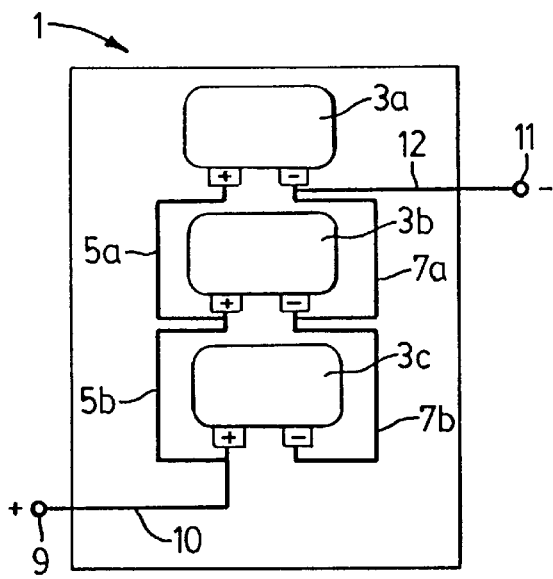
FIG. 1 is a schematic view of a battery connection arrangement according to the present invention.

Reference is first made to FIG. 1 which shows a battery pack 1 according to the present invention.

The battery pack 1 comprises a number of individual battery modules 3, shown individually as 3a, 3b, 3c. The battery modules 3 are connected in parallel at the positive terminals by interconnecting leads or cables 5, shown individually as 5a and 5a, and at the negative terminals by interconnecting leads 7, shown individually as 7a and 7b. As shown, the battery pack 1 includes a positive output terminal 9 and a negative output terminal 11. The positive terminal 9 is connected to the positive interconnecting lead 5 through a positive terminal lead 10 and the negative terminal 11 is connected to the negative interconnecting lead 7 through a negative terminal lead 12.

Figure 2:
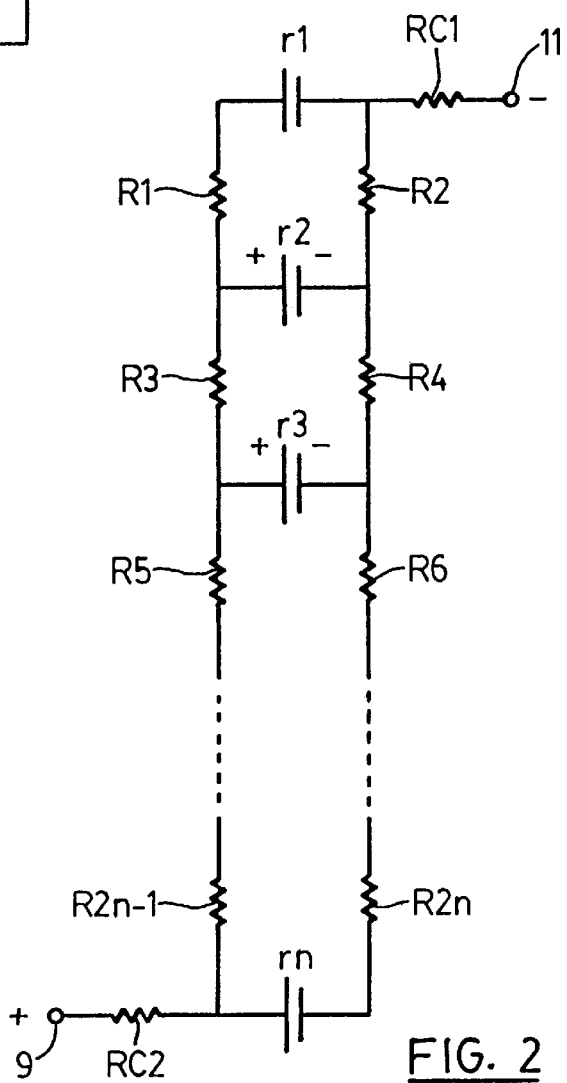
FIG. 2 is a schematic view of the resultant interconnection resistance for the connection arrangement of FIG. 1.

Reference is next made to FIG. 2, which shows an equivalent circuit 2 for the battery pack 1 of FIG. 1. In the equivalent circuit. 2, the conductors for the interconnecting leads 5, 7 and terminals 9, 11 are replaced by resistive elements as shown in FIG. 2. The positive interconnecting leads 5a, 5b, 5c, . . . are represented by respective resistors $R_1, R_3, R_5, \ldots R_{2n-1}$. Similarly, the negative interconnecting leads 7a, 7b, 7c, . . . are represented by respective resistors $R_2, R_4, R_6, \ldots R_{2n}$. The positive terminal lead 10 is represented by resistor $R_{C2}$, and the negative terminal lead 12 is represented by resistor $R_{C1}$. As also shown in FIG. 2, the battery modules 3 are represented by cells r1, r2, r3, . . . rn, respectively, where r1, r2, r3 represents the internal resistance of the respective battery module 3.

It is a feature of the present invention that the battery modules 3 are connected in parallel and the interconnecting leads 5 and 7 have the same length so that the charging current applied to the terminals 9, 11 is shared equally between the individual battery modules 3a, 3b, 3c. This feature of equally sharing the current is particularly important during the recharging of the battery modules 3, particularly, when a high rate or rapid charger is used, i.e. the charging rate for a battery module 3 is greater than a 1C. The equal current sharing feature of the battery pack 1 ensures that the individual battery modules 3 are charged equally.

Referring again to FIG. 2, the overall resistance for each of the modules 3 in the battery pack 1 will be as follows:

$$\sum R_1 = R_{C1} + r_1 + R_1 + R_3 + \ldots + R_{2n-1} + R_{C2}$$

$$\sum R_2 = R_{C1} + R_2 + r_2 + R_3 + \ldots + R_{2n-1} + R_{C2}$$

$$\ldots$$

$$\sum R_n = R_{C1} + R_2 + R_4 + \ldots + R_{2n} + r_n + R_{C2}$$

As will be understood by one skilled in the art the rate of charging for batteries is affected by three primary factors. The internal resistance (i.e "r") of the module 3 is a function or charging current, state of charge in the battery and internal temperature of the battery.

The arrangement for the battery pack 1 according to the present invention addresses these factors to provide optimum charging of the individual modules 3 in the battery pack 1. Firstly, the battery pack 1 allows the modules 3 to be positioned in physically close relationship so that the modules 3 will be isothermal and this will minimize the temperature difference between modules 3 during charging. The modules 3 are tightly grouped both physically and electrically, and as a result the same state of charge can be assumed for each module 3, and represented as:

$$r_1 = r_2 = \ldots = r_n$$

It is a feature of the present invention that the interconnecting leads (i.e. cables) 5, 7, 10, 12 have the same "electrical length", that is, the same ohmic resistance, and the ohmic resistance is represented as:

$$R_1 = R_2 = \ldots = R_{2n} \text{ and } R_{C1} = R_{C2} = R_C$$

Accordingly, the total DC resistance for each of n battery modules 3 is represented as follows:

$$\Sigma R = 2 \cdot R_C + r + (n-1) \cdot R$$

Therefore, the resulting voltage drop across every module 3 in a group or battery pack 1 will be identical.

The battery pack 1 arrangement shown in FIG. 1 was tested using three standard 12V battery modules (manufactured by OPTIMA) and connected in parallel according to the present invention. The battery pack 1 was successfully cycled through a series of more than a hundred high charge rate cycles. A high rate charge cycle is defined to be greater than a 1C rate on the battery module. In this test, the battery pack 1 was charged at 600A, divided among the three battery modules 3a, 3b, 3c with 200A each. The nominal capacity for each battery module 3, as rated by the manufacturer, was 56 Ahr giving approximately a 3.5C charge rate. It was found that the interconnection arrangement according to the present invention provided uniform charging conditions for each module 3 in the pack 1 throughout the testing cycle.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A battery pack comprising:
   (a) a plurality of battery modules, each of said battery modules having a positive terminal and a negative terminal;
   (b) positive interconnecting cables for connecting the positive terminal of each of said battery modules;
   (c) negative interconnecting cables for connecting the negative terminal of each of said battery modules;
   (d) a negative output cable coupled to the negative terminal of one of said battery modules;
   (e) a positive output cable coupled to the positive terminal of one of said battery modules;
   (f) wherein said positive and negative interconnecting cables each have the same length; and
   (g) wherein said positive and negative output cables have the same length.

2. The battery pack as claimed in claim 1, wherein adjacent battery modules are positioned in close proximity to each other in an isothermal zone.

3. The battery pack as claimed in claim 2, wherein said positive and negative interconnecting cables have a minimum length for spanning the distance between the respective positive and negative terminals on adjacent battery modules.

4. The battery pack as claimed in claim 1, wherein said battery modules comprise rechargeable battery modules.

* * * * *